United States Patent Office 3,121,780
Patented Feb. 18, 1964

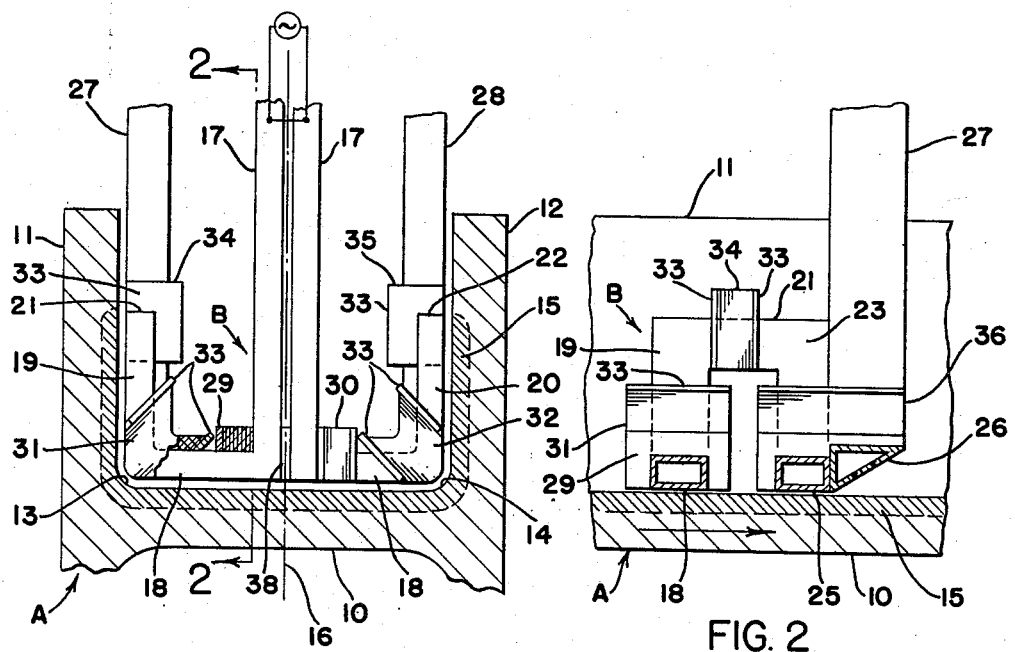
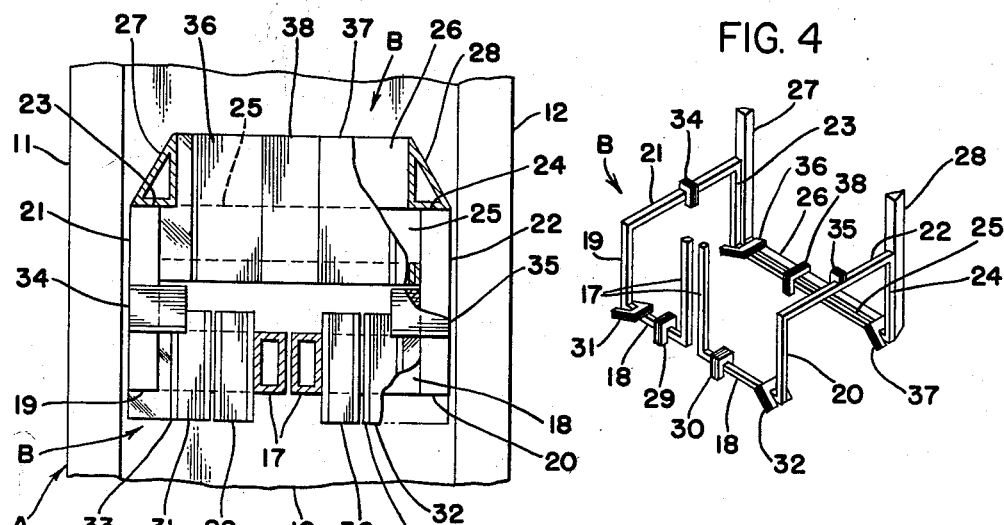

3,121,780
INDUCTOR FOR HEATING A CHANNEL MEMBER
George M. Mucha, Parma, and George H. Ledl, South Russell, Ohio, assignors to The Ohio Crankshaft Company, Cleveland, Ohio, a corporation of Ohio
Filed July 10, 1961, Ser. No. 122,840
3 Claims. (Cl. 219—10.79)

This invention relates to the art of high frequency induction heating and more specifically to an inductor arrangement for such heating.

The invention is applicable to high frequency progressive induction heating of spring hangers and will be described with particular reference thereto. Spring hangers are guide and support brackets for springs of trucks. They serve to vary the effective length of the spring and thereby provide a uniform riding quality. Their shape is essentially a compound curve of a U-channel member with attaching provisions, and it is the inner channel surfaces which require hardening for better wear resistance. It will be understood that this invention has other similar applications.

In the art of high-frequency progressive induction heating, it is necessary to provide adequate clearance for passage of the part in relation to the inductor; yet there must be sufficiently close coupling to establish efficient heating and maintain control of the hardness pattern. The inductor creates an electro-magnetic flux field which penetrates and induces a current flow in that area of the part which is adjacent to the inductor and due to the resistivity of the material, heating of the part ensues.

In induction heating of a channel member, it is difficult to heat the inwardly facing surfaces. This is because the current tends to concentrate on the inside of the coil and the resultant electro-magnetic flux field is less concentrated on the outside thereof, and therefore, less effective for heating purposes. As an aid in controlling and directing the electro-magnetic flux field, resort has been made to the use of iron laminations made from thin electrical sheet stock. By careful use of this lamination material in both quantity and configuration, the heating effect and corresponding hardness pattern can be controlled.

The principal difficulty with spring hangers has been in obtaining sufficient heat in the filleted areas, due to the electro-magnetic flux field tending to couple with the adjacent flat sidewalls first and not penetrating the fillet area, such that after quenching there is either a shallow hardness pattern or no hardness pattern at all in the filleted areas.

The present invention contemplates a design of an inductor which overcomes the above-referred to difficulties and others, provides an inductor arrangement which is electrically efficient and comparatively small in size.

In accordance with the present invention an inductor is provided for progressively heating a base, sidewalls and adjoining fillets of a U-channel, such inductor being comprised of two longitudinally spaced conductors each extending transversely across the base, around the fillets and outwardly along the sidewalls of the U-channel, and a pair of transversely spaced longitudinally extending conductors extending along the sidewalls and connected to the transversely extending conductors. Magnetically permeable material such as iron laminations of U shape and L shape configurations are placed on the inductor opposite the fillets, base and sidewalls to increase the heating effect thereat and provide an even heat pattern throughout the entire U-channel section.

The principal object of the invention is the provision of a new and improved inductor to progressively heat the inside of a channel uniformly over all of the surface thereof including the fillets.

Still another object of the invention is to provide an inductor which will also harden the approaching radial path and exiting radial path extensions of the base of the U-channel.

Still another object of the invention is to provide an inductor to operate in conjunction with a separately controlled quench chamber.

The invention may take physical form or shape in certain parts or arrangement of parts, the preferred embodiment of which will be described in detail in this specification and illustrated in the accompanying drawing which is a part hereof and wherein:

FIG. 1 is a front elevational view of a high frequency inductor head employing the present invention and capable of performing according to the invention and is shown in relation to a U-channel shape representing the part;

FIG. 2 is a sectional view taken through line 2—2 of FIG. 1;

FIG. 3 is a top elevational view of FIG. 1; and,

FIG. 4 is a schematic view of the main inductor circuit with lamination position in relation thereto.

Referring now to the drawings wherein the showings are for the purpose of illustrating a preferred embodiment of the invention only and not for the purpose of limiting same, the figures show a workpiece A in heating relationship with an inductor B.

The workpiece A is in the shape of an elongated channel having a base 10, and spaced parallel sidewalls 11 and 12 joined to the base by fillets 13 and 14. The inner surface of this channel shape is to be heated and quench hardened to obtain a hardening pattern 15 shown in FIG. 1. The workpiece A is progressed past the inductor B in close spaced relationship thereto. The spaced relationship being maintained by a fixture that allows the operator to locate the workpiece so the base of the workpiece is a fixed distance from the bottom of the inductor and the sidewalls are centered with respect to the inductor centerline 16. This fixture moves the workpiece past the inductor at a proper rate of speed to adequately heat and quench the workpiece to obtain the desired hardness pattern.

The inductor B includes power leads 17 each connected to transverse conductors 18 extending transversely of the channel and in close spaced relationship to the base 10 of the workpiece. The conductors 18 then connect at their ends to conductors 19, 20 which follow in close spaced parallel relationship to the sidewalls 11 and 12 of the workpiece A. The corners between conductors 18, 19 and conductors 18, 20 are rounded to match the fillets 13 and 14 of the workpiece. The other ends of conductors 19, 20 extend up the sidewalls in close spaced relationship thereto a distance approximating the height of the desired hardness pattern. At this point the conductors connect to conductors 21, 22 which then extend parallel to the sidewalls in close spaced relationship thereto. The phrase "parallel to the sidewalls" is used to denote conductors following along the length of the elongated channels shape.

Conductors 21, 22 are of a length sufficient to provide clearance for the interconnecting U-channel shape for ease of assembly. These conductors then connect to conductors 23, 24 which extend transverse to the length of the channel shape and in close spaced relationship to the sidewalls.

The conductors 23, 24 extend toward the base of the channel shaped workpiece and are here interconnected by a conductor 25 which is in close spaced relationship to the base and extending transversely thereto. The intersecting conductors 23, 25 and 24, 25 are rounded to match the corresponding fillets 13, 14 of the workpiece. This completes the electrical circuit except for connecting electrical leads 17 to the high frequency terminal ends (not shown).

The inductor also includes a U-shaped tube attached to the second transverse U of the inductor comprising conductors 23, 25 and 24. This tube is located on the trailing edge of the inductor and forms a quench chamber 26. The quench chamber 26 is drilled to allow the quench liquid therein to impinge upon the previously heated area of the workpiece a short distance behind the inductor. The quench holes are preferably angled such that the quench washes away from the inductor rather than toward the inductor. A preferred angle at which the liquid impinges is 30°. The quench holes should be of sufficient number so as to provide an even quenching action.

The quench chamber 26 is supplied from a source of quench fluid through feed inlets 27, 28.

The inductor also includes magnetically permeable material placed in various locations around the inductor circuit. The form of magnetic permeable material used is electrical sheet stock such as armature lamina material; however, other material could be used. A number of U and L-shaped pieces are cut or formed from this stock, the size being dependent upon the size of tubing used to form the conductor sections. In the case of rectangular tubing, the width of the side presented to the workpiece has to be considered. The lamination groups 29, 30 are placed on each side of the electrical leads 17 so the laminations are perpendicular to the conductor 18. The purpose of the laminations being placed here is to aid in overcoming "fishtail" effect, which is a tendency for the hardness pattern to have less depth at the point where the leads join the inductor.

One layer of each lamination group 29, 30 is adjacent the electrical leads 17 while the other layers of the group are spaced along the conductor 18. The next group of laminations 31, 32 are also U shape and are placed at the intersection of conductor 18 with conductors 19, 20. They are positioned at a 45° angle to the base conductor 18. This angled position of the laminations 31 and 32 is necessary to couple the fillet areas and provide equivalent coupling on each side of the intersection point between the base and sidewalls of the workpiece. As a means of holding the position of the conductor with respect to the lamination groups, copper shields 33 are brazed on each side of the fillet lamination groups 31, 32. These shields also aid in conducting heat away from the lamination group.

From the fillet area to the top of the hardness pattern on the sidewalls no additional laminations are used on the conductors 19, 20. The next area in which laminations are placed is on the sidewall conductors 21, 22. These laminations 34 and 35 are in an L shape, the inside dimension of the L corresponding to the dimension of the rectangular tubing used. Copper shields 33 are also used in this area on each side of the lamination groups. The two groups of laminations 34 and 35 are the only laminations used on these sidewall conductors 21 and 22.

At the intersection of conductors 23, 25 and conductors 24, 25, laminations are again used to control the heating pattern of the fillet area. Since the quench chamber 26 is attached to the rear of the loop formed by conductors 23, 24 and 25, the laminations in this area are of an L shape with the laminations extending over the quench chamber 26 rather than around the third side of the conductors. The fillet area is made with the laminations at a 45° angle, but the lamination groups 36, 37 are not equally spaced from the conductor intersect points. The laminations are extended along the conductor 25 to points opposite the electrical leads 17 on conductor 18 at which points the angled lamination groups are stopped and they are there supported by a copper shield. The remaining area on conductor 25 immediately opposite the electrical leads has laminations 38 applied perpendicularly to the conductor 25 so as to further aid in overcoming the "fishtail" effect.

It should be noted that the basic inductor configuration is constructed from tubing and is cooled by fluid flow through the tubing. This fluid is usually water and is circulated in a chamber separate from the quench chamber.

So that there can be no confusion as to the electrical circuit path, a schematic perspective sketch is shown in FIG. 4 with the same numbering of parts as used in the other figures.

The present invention has proved to be extremely practical in practice and has eliminated the problems of uneven heating and hardness pattern of the prior art. The invention is not limited to the specific type of inductor shown, but is adaptable to similar forms of U-type channel heating and quenching arrangements and it is my intention to include all such modifications and alterations insofar as they come within the scope of the appended claims.

Having thus described our invention, we claim:

1. An inductor for progressively heating a U-shaped channel having a base, two upstanding sidewalls and fillets between the sidewalls and the base, said inductor comprising a first and a second conductor spaced from each other and extending transversely across the base, said first and second conductors being spaced from the base, a third and a fourth conductor, one extending longitudinally along each sidewall and spaced therefrom, said third and fourth conductors spaced upwardly from said first and second conductors and joined thereto to form a continuous electrical loop, said first conductor divided at a position midway between said sidewalls to define a first and second leg, a pair of power leads, one connected to each of said legs at said midway position, a first and second lamination group adjacent said base, one of said group secured over each of said legs and adjacent said power lead, a third lamination group adjacent said base and secured over said second conductor at a position midway between said sidewalls, and other lamination groups facing from said first and second conductors toward said fillets to control the heating pattern in said fillets.

2. An inductor as defined in claim 1 wherein said second conductor has a quench body attached thereto, said body having a central quench chamber and orifices extending from said chamber for directing a quenching fluid from said chamber onto said channel.

3. An inductor as defined in claim 1 wherein each of said other lamination groups forms substantially at 45° angle with one of said first or second conductors and faces said fillets.

References Cited in the file of this patent

UNITED STATES PATENTS

| 2,419,619 | Wood | Apr. 29, 1947 |
| 2,761,048 | Tudbury | Aug. 28, 1956 |

FOREIGN PATENTS

| 933,473 | Germany | Apr. 23, 1953 |